US008823809B1

(12) United States Patent
Jensen et al.

(10) Patent No.: US 8,823,809 B1
(45) Date of Patent: Sep. 2, 2014

(54) METHODS AND SYSTEMS FOR INCREASING IMAGE SENSOR SENSITIVITY

(75) Inventors: David W. Jensen, Marion, IA (US); Jaclyn A. Hoke, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 803 days.

(21) Appl. No.: 12/890,879

(22) Filed: Sep. 27, 2010

(51) Int. Cl.
  *H04N 5/228* (2006.01)
(52) U.S. Cl.
  USPC .................................. 348/208.4; 348/208.99
(58) Field of Classification Search
  USPC ................................ 348/208.6, 208.12, 222.1
  See application file for complete search history.

(56) References Cited

U.S. PATENT DOCUMENTS

2007/0147506 A1* 6/2007 Kwon et al. ............. 375/240.16
2009/0067742 A1* 3/2009 Lim et al. ...................... 382/263
2009/0256921 A1* 10/2009 Pertsel et al. ............. 348/208.16
2010/0045810 A1* 2/2010 Chun-Ru et al. ........... 348/222.1
2010/0134640 A1* 6/2010 Kuo et al. .................. 348/208.6
2011/0216210 A1* 9/2011 Hao .......................... 348/222.1

OTHER PUBLICATIONS

NYU Aug. 3, 2006, USA, http://cs.nyu.edu/~fergus/papers/deblur_fergus.pdf, "Removing Camera Shake from a Single Photograph" by Rob Fergus et al.,pp. 1-8.
ACM Transactions on Graphics, vol. 27, No. 3, Article 73, Publication date: Aug. 2008, "High-quality Motion Deblurring from a Single Image" by Qi Shan et al., pp. 1-10, http://www.cse.cuhk.edu.hk/~leojia/projects/motion_deblurring/deblur_siggraph08.pdf.

* cited by examiner

*Primary Examiner* — Twyler Haskins
*Assistant Examiner* — Angel L Garces-Rivera
(74) *Attorney, Agent, or Firm* — Donna P. Suchy; Daniel M. Barbieri

(57) ABSTRACT

The present invention includes a system and method for increasing sensitivity of a video sensor which includes in one embodiment a distributed, parallel processing motion blur reduction system. The system includes at least one imaging sensor that outputs image data. The system uses a plurality of processors, each of which receives from the imaging sensor, data representative of an independently viewable, complete and separate image subsection. A designated processor receives output data from each of the plurality of processors, and processes such output data to generate a signal which is representative of blur causing motion. The invention also includes methods for removing motion blur.

11 Claims, 6 Drawing Sheets

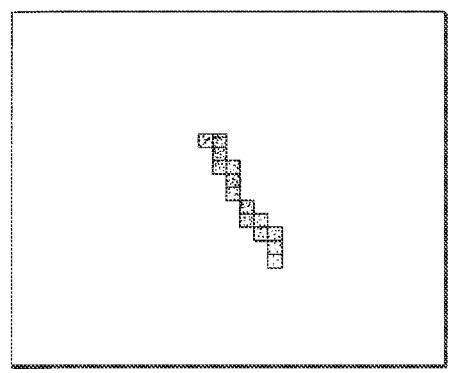
(PSF 1)
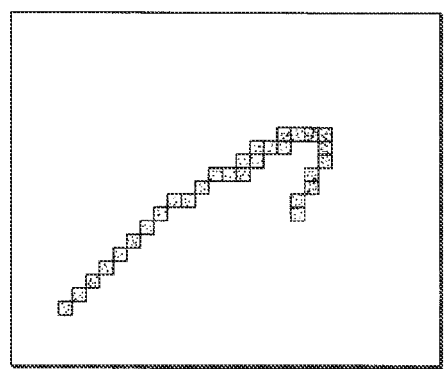
(PSF 2)
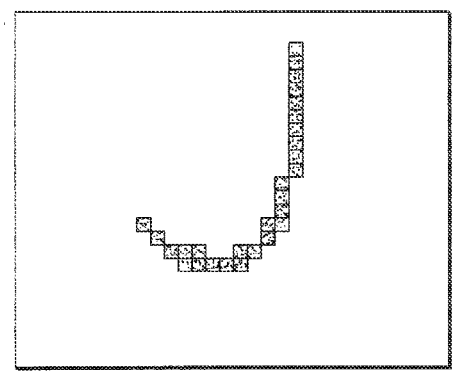
(PSF 3)
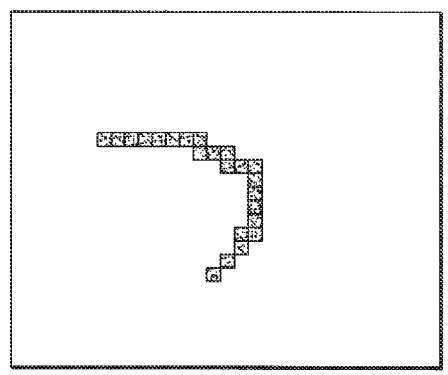
(PSF 4)
FIG.5

METHODS AND SYSTEMS FOR INCREASING IMAGE SENSOR SENSITIVITY

CROSS REFERENCE TO RELATED APPLICATIONS

This application relates to the following applications and each incorporated herein by these references in their entirety:

Multiprocessor Discrete Wavelet Transform by John K. Gee, Jennifer A. Davis, David W. Jensen and James Potts, and having Ser. No. 12/572,600 and filed on Oct. 2, 2009;

Custom Efficient Optical Distortion Reduction System and Method by David W. Jensen, Richard D. Tompkins and Susan Robbins, and having Ser. No. 12/572,669 and filed on Oct. 10, 2009;

Multiple Aperture Video Imaging System by David W. Jensen and Steven E. Koenck, and having Ser. No. 12/572,492 and filed on Oct. 10, 2009;

and Optical Helmet Tracking System by Jaclyn A. Hoke and David W. Jensen, and having Ser. No. 12/572,542 and filed on Oct. 10, 2009.

FIELD OF THE INVENTION

The present invention relates to image sensor sensitivity improvement and removal of image motion blur resulting from increased exposure time.

BACKGROUND OF THE INVENTION

In the past, image sensor sensitivity was increased by various methods among which included increasing exposure time. This approach is helpful at achieving some sensitivity improvement goals but often introduces artifacts that degrade image quality, such as blur. Image motion deblurring has been used for specific applications with some success and in the past, image motion deblurring has been accomplished in several ways; including blind and non-blind deconvolution. These techniques have resulted in much improvement in image quality. However, not all blurring is removed and some unintentional deblurring introduced artifacts remain after the deblurring operations are performed. Also, some techniques are difficult to perform in real time.

Digital night vision goggles, video cameras and many other systems could benefit greatly from increased sensor sensitivity.

Consequently, there is need for improvement in image sensor sensitivity using increased exposure time in combination with image motion deblurring methods and systems.

SUMMARY OF THE INVENTION

The present invention includes a real time system and method for improved sensor sensitivity by way of increased exposure time in combination with other image motion deblurring techniques. More particularly the present invention is a method of improving sensor sensitivity comprising the steps of:

providing a sensor with a predetermined sensitivity characteristic;

determining that the predetermined sensitivity characteristic of the sensor is insufficient to meet a predetermined design requirement;

increasing an exposure time for said sensor to an extended exposure time which is beyond a predetermined exposure limit; and using image deconvolution for removing motion blur from an image corresponding to said extended exposure time.

BRIEF DESCRIPTION OF THE DRAWINGS

In the drawings:

FIG. 5 an array of four local point spread function (PSF) plots, in accordance with the present invention.

DEFINITIONS

"Independently viewable, complete and separate image subsections" shall hereafter be construed to mean: components of an array of image tiles which are either viewable portions of a larger image of a larger area which has been subdivided into smaller image subsections or complete small viewable images of small areas, which when stitched together into an array, substantially recreate a larger image of a larger area. Note: adjacent subjections may not be completely separate in that it may be desirable to have relatively small areas of overlap at the periphery of each subsection.

"Global Motion" of the camera may be calculated for each image frame and provide an absolute or relative position and orientation of the camera in the world or other reference frame.

DETAILED DESCRIPTION

For many years it has been well known that longer exposure times can be used to improve sensor sensitivity and that this often introduces blurriness. The present invention uses computing to reduce blurriness and yet retain sensor sensitivity improvement.

In the present invention, fast motion deblurring algorithms, more formally known as image deconvolution algorithms, are employed to counteract such effects.

Image Deconvolution Overview:

Ideally, an image captures a scene instantaneously in time and as a result is formed perfectly with no blur. However, real images are integrated over some time interval during exposure, and if the image sensor is not perfectly steady results in motion blur. Additional deficiencies occur in the process, such as optical blur caused by the lens not focusing perfectly on the sensor. Image deconvolution is the process of estimating the point spread function (PSF) that models the blur introduced by motion and optical deficiencies and using it to recover the "ideal" image. It is impossible to recover the true PSF, and the accuracy of the approximation dictates the quality of the final result.

Figure 1:
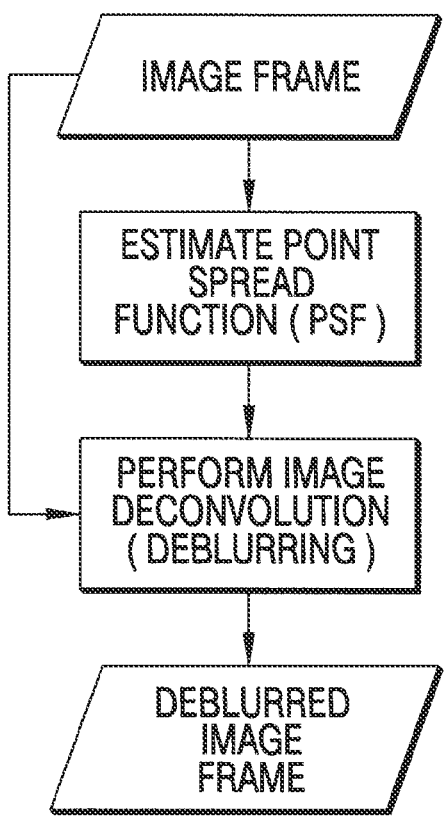
FIG. 1 shows a blind deconvolution flow diagram of the prior art.

Blind deconvolution estimates the PSF and the frame image blur without any prior knowledge of the motion or optical deficiencies and can be done using individual frames or using multiple frames. FIG. 1 shows a flow diagram of blind deconvolution for a single frame. The frame is processed to estimate the PSF the models the motion undergone by the frame. Once the PSF is estimated, it is applied to the blurred image frame to recover the deblurred frame, a process that has been well-studied. This method often assumes that the motion was at a constant velocity and was uniform across the entire image, thus constraining the parameters of potential PSF results. As a result, it is limited in its application because real motions are much more complex and incorrectly estimating the PSF often creates serious artifacts in the resulting image.

Figure 2:
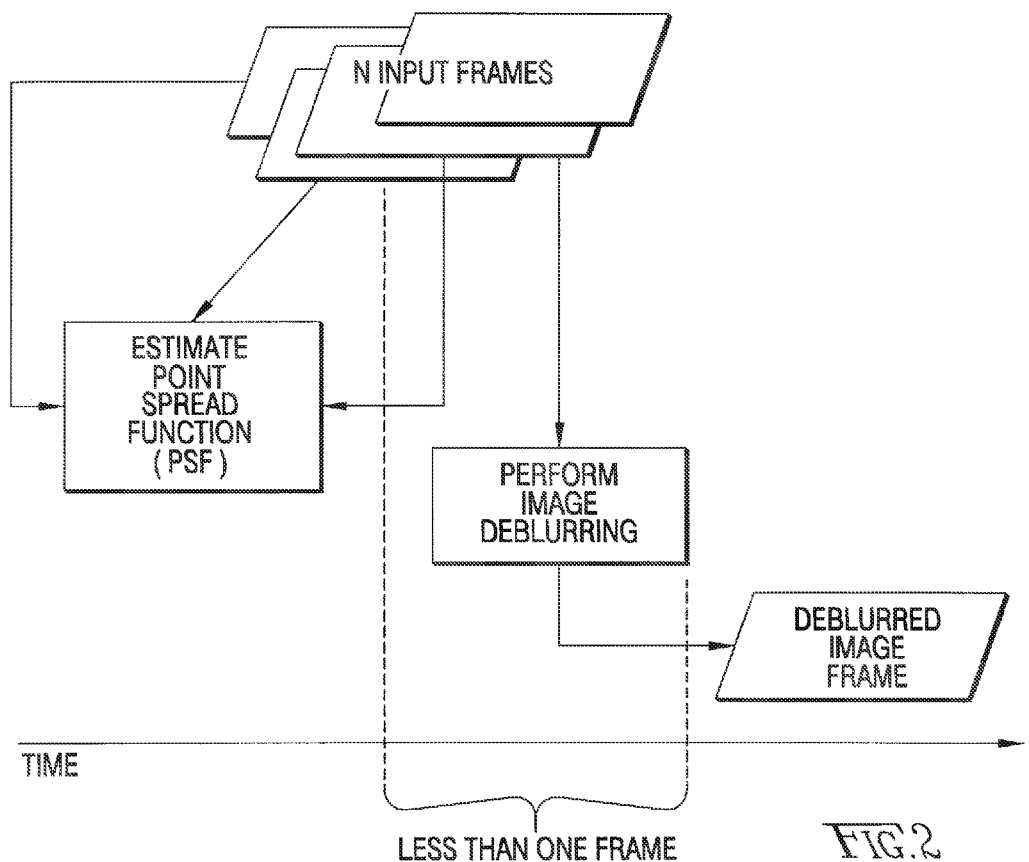
FIG. 2 shows a multiple frame deconvolution flow diagram of the present invention.

To avoid the introduction of a full frame of latency, a second technique captures and processes multiple frames. The computed improvements can be iteratively refined and applied to a current frame representation with minimal introduction of noise and artifacts. FIG. 2 shows a flow diagram for deconvolution using multiple image frames as it would be applied to the current frame. In this process, a set of N input frames are used to estimate the PSF that describes the camera motion during capture from the first of the N frames through the current frame. The PSF is applied to the current frame, resulting in a deblurred image. To process subsequent frames, the current frame is included in the set of N frames used to calculate the PSF that is applied to the next frame. This is more complex than the single frame approach because the process of estimating the PSF across multiple frames requires a method for tracking objects and/or the motion through the series of images.

There are many prior art algorithms for approximating a PSF, and the end application has to consider the tradeoff between improved results and higher computational complexity. A Discrete Wavelet Transform (DWT) software framework can provide acceptable deblurring results with real time performance using multiple resolution levels for analysis. This process searches for motion between low resolution representations of two frames and refines the motion estimate using high resolution representations. Searching on the low resolution and refining with the high resolution significantly reduces the processing time. The deconvolution portion of the algorithm uses the motion vector as a seed for the PSF and performs an iterative refinement of the blurred image.

Distributed Image Deconvolution Overview:

Computational complexity is a large hurdle in developing a real-time system. One embodiment of the present invention involves the use of multiple microprocessors and distributed computing where each microprocessor handles the computations for a small subsection of the image frame. The distribution of the computations can be done in multiple ways, several of which will be discussed below using an example image divided into sixteen subsections that each has a corresponding microprocessor to perform the computations.

Figure 3:
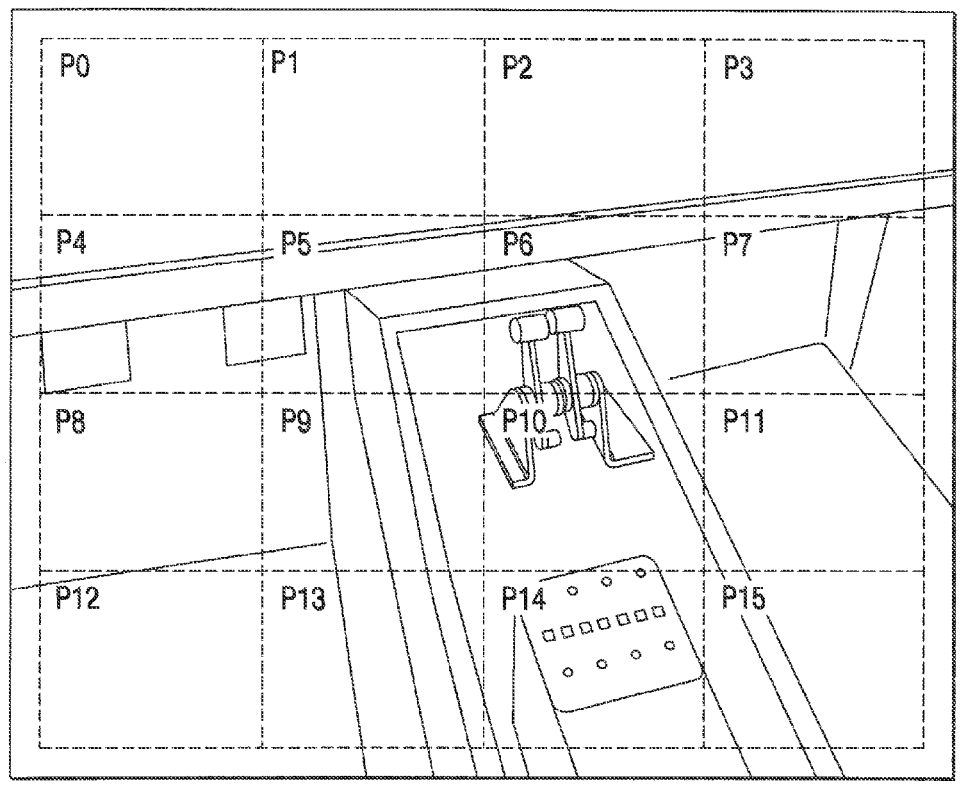
FIG. 3 shows how a single image frame captured by a single camera may be divided into subsections, in accordance with the present invention.

FIG. 3 shows a single image subdivided into 16 independently viewable, complete and separate image subsections, it also could show a collection of 16 small images from 16 different sensors where each such image is an independently viewable, complete and separate image. In one embodiment each subsection of a single image or each small image will use its own microprocessor to analyze the subsection or small image. These 16 independent microprocessors (P0-P15) would be coupled in some way to provide communication therebetween. In one embodiment the 16 processors could be 16 cores of a multi-core processor with communication capabilities between the cores. The number 16 is used herein as an example of any number of multiple images subsections, small images, microprocessors or cores.

Figure 4:
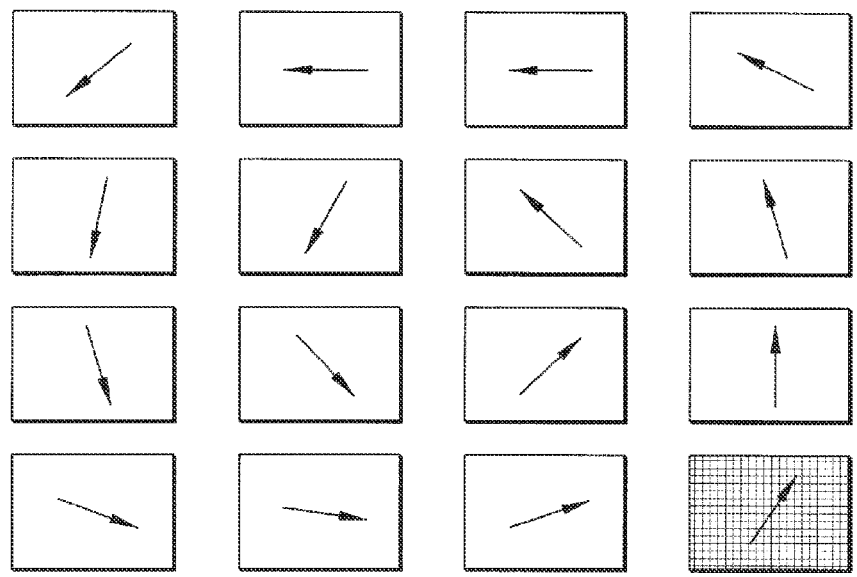
FIG. 4 shows locally calculated motion vectors across sixteen processors, in accordance with the present invention.
Figure 6:
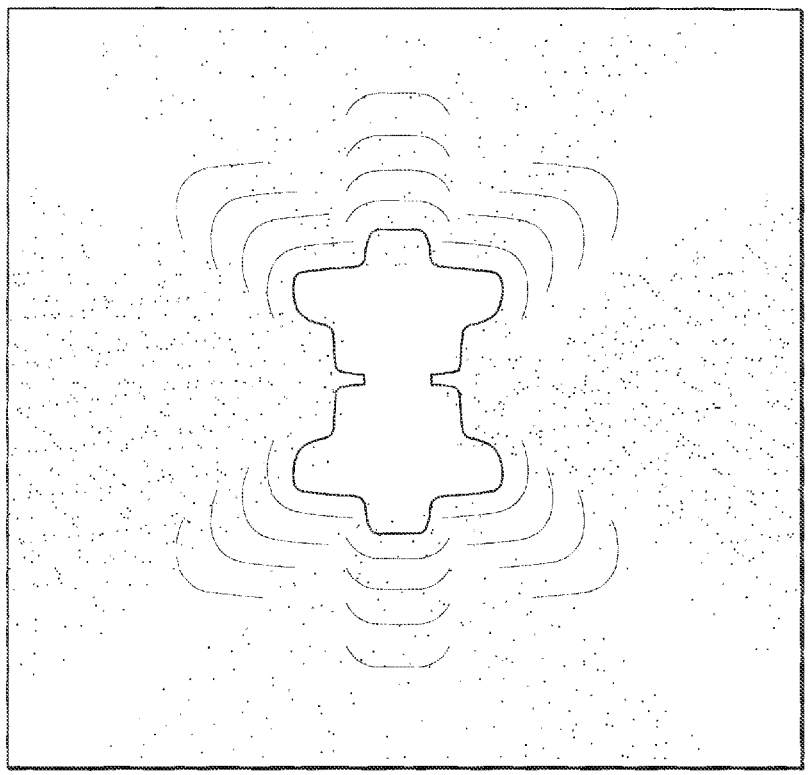
FIG. 6 is an image of a global PSF based upon the four local PSF, in accordance with the present invention.

Now referring to FIG. 4 there is shown an array of local motion vectors which are computed each by its own processor and communicated to a designated processor, which is shown with a grid-like background. FIG. 4 clearly shows that the local motion perceived by each processor for its subsection does not reflect the true global motion undergone by the image. The local motion of each subsection can be depicted by a vector, which with the use of a least squares optimization technique, or other similar techniques, will provide the ability to derive a more accurate representation of the overall or global motion vector of the combined image. This vector contains the local processor's computed interpretation of the rotation and translation of motion for the camera. This is also represented as [Rp,Tp] in matrix notation. The vectors (or rotation and translation information) are transmitted and gathered on one processor. The processor would convert the local vectors to the global space by applying an appropriate transformation. Typically a simple sensor location translation would be applied to the local motion [Ts] [Rp,Tp]. The set of locally computed motions are combined using a least squares optimization technique to produce a more accurate global vector [Rg,Tg]. The global motion vector is used to compute the global PSF for deblurring the entire image frame.

Now referring to FIG. 5 there is shown an alternate approach which involves the most local computation, and has three variants. Local motion estimates are obtained for each subsection of the image, as above with respect to FIG. 4, but in this approach they are used to compute a local PSF for each subsection. In the first variant, the local PSFs are communicated to a designated processor that combines them into a global PSF. FIG. 5 shows an array of 4 local PSF plots, one for each subsection of an image assumed in this example to be divided into 4 subsections. These 4 PSF plots are combined to produce a global PSF which is used to deblur the entire image frame. In the second variant, the local PSFs are applied locally to the image frame subsection but deblur only the subsections that need it the most. A person's face may be deblurred while a moving arm is left unaddressed. This eliminates the need for communication between the various processors and can speed up the entire process. The third variant uses a voting or rating system to select one of the local PSFs to apply globally to the entire image.

As mentioned above, known methods such as those utilizing the discrete wavelet transforms (DWT) could be used to carry out various portions of the certain aspects of the present invention. Techniques similar to that which is described in the co-pending application; Multiprocessor Discrete Wavelet Transform by John K. Gee, Jennifer A. Davis, David W. Jensen and James Potts, and having Ser. No. 12/572,600; may be useful in carrying out the present invention.

Most existing image deblurring methods are single frame approaches, estimating the PSF for a given frame and applying it to that frame only. In the context of deblurring video in real time, a multi-frame approach could be used to carryout various portions of certain aspects of the present invention. Video sequences show a high degree of continuity over time, and as a result, the PSFs estimated for previous frames can be used to "seed" the estimation process. This seeding provides an initial estimate for the PSF that could allow the algorithm to converge on more accurate results, and to converge more quickly.

It will be further appreciated that functions or structures of a plurality of components or steps may be combined into a single component or step, or the functions or structures of one-step or component may be split among plural steps or components. The present invention also contemplates that individual items on lists discussed above may be combined with other individual items from that same list or different lists. Furthermore, it is contemplated that one or more individual items may be eliminated from the lists discussed above and combined with other lists. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A method of improving sensor sensitivity comprising the steps of:
    providing a sensor with a predetermined sensitivity characteristic, which provides a source of image data;
    determining that the predetermined sensitivity characteristic of the sensor is insufficient to meet a predetermined design requirement;
    increasing an exposure time for said sensor to an extended exposure time which is beyond a predetermined exposure limit;
    providing a first processor configured for monitoring said sensor over a predetermined range of time;
    providing a plurality of processors each of which receives data representative of an independently viewable, complete and separate image subsection of said image data,
    providing a designated processor that at least indirectly receives output local data from each of said plurality of processors, and processes such output local data to generate a signal which is representative of blur producing motion of the source of image data; and
    wherein the sensor is a source of video image data; and
    calculating, with said designated processor, a global correction for global motion of the sensor.

2. A system for improving sensor sensitivity by using increased exposure time and using a distributed parallel processing motion blur reducing system, the sensor system comprising:
    a sensor providing a source of image data;
    a first processor configured for monitoring said sensor over a predetermined range of time, where said predetermined range of time is a period of time longer than a period where further increases in said range of time results in motion blur image degradation which exceeds image improvements resulting from sensitivity increases from extended exposure time;
    a plurality of processors each of which receives data representative of an independently viewable, complete and separate image subsection of said image data,
    a designated processor that at least indirectly receives output local data from each of said plurality of processors, and processes such output local data to generate a signal which is representative of blur producing motion of the source of image data; and
    wherein the designated processor is one of the plurality of processors and the sensor is a source of video image data.

3. The system of claim 2, wherein said output local data is output local motion data and wherein the sensor is a system of a plurality of video sensors.

4. The system of claim 2, wherein said output local data is output local motion blur reduction correction data.

5. The system of claim 2, wherein the source of image data is a plurality of sensors.

6. The system of claim 2, wherein the source of image data is a single sensor.

7. A sensor system with improved sensor sensitivity and a distributed parallel processing system for determining movement of a sensor and reducing motion blur in an image the sensor system comprising:
    a plurality of sensors, each sensitive to the same frequencies of electromagnetic energy, wherein the plurality of sensors output sensor data divided into a plurality of independently viewable, complete and separate image subsections and wherein the plurality of sensors are disposed in a camera;
    a plurality of processors, wherein each processor:
    receives motion blurred data from one of said plurality of sensors;
    receives data representative of one of the plurality of independently viewable, complete and separate image subsections;
    determines at least one parameter for the independently viewable, complete and separate image subsection;
    outputs the at least one parameter; and
    a designated processor that at least indirectly receives data at least partially representative of the at least one parameter from the plurality of processors and calculates the global motion of the plurality of sensors.

8. The apparatus of claim 7, wherein the designated processor is a different type of processor than the plurality of processors.

9. The apparatus of claim 7, wherein the at least one parameter is a local motion vector for each of the independently viewable, complete and separate image subsections.

10. The apparatus of claim 7, wherein the plurality of sensors comprise a visible light sensor.

11. The apparatus of claim 7, wherein said plurality of sensors comprises a plurality of image sensors each configured to monitor only an identical set of predetermined frequency ranges of electromagnetic radiation.

* * * * *